United States Patent [19]

Mushabac

[11] Patent Number: 5,017,139

[45] Date of Patent: May 21, 1991

[54] MECHANICAL SUPPORT FOR HAND-HELD DENTAL/MEDICAL INSTRUMENT

[76] Inventor: David R. Mushabac, 919 Ocean Ave., Brooklyn, N.Y. 11226

[21] Appl. No.: 548,687

[22] Filed: Jul. 5, 1990

[51] Int. Cl.[5] .......... A61C 19/04; A61C 3/02; A61C 1/02; A61C 1/08; A61C 1/18

[52] U.S. Cl. .......... 433/109; 433/72; 433/108; 433/76

[58] Field of Search .......... 433/72, 75, 76, 107, 433/108, 109, 103; 408/46, 241

[56] References Cited

U.S. PATENT DOCUMENTS

| | | | |
|---|---|---|---|
| 3,083,462 | 3/1963 | Jermyn | 433/109 |
| 4,182,312 | 1/1980 | Mushabac | 433/68 |
| 4,344,755 | 8/1982 | Gold et al. | 433/76 |

FOREIGN PATENT DOCUMENTS

| | | | |
|---|---|---|---|
| 891765 | 11/1981 | Fed. Rep. of Germany | 433/109 |

*Primary Examiner*—John J. Wilson

*Assistant Examiner*—Cindy A. Cherichetti

*Attorney, Agent, or Firm*—McAulay Fisher Nissen Goldberg & Kiel

[57] ABSTRACT

A mechanical support for holding a dental medical instrument includes multiple segments which are mounted to one another to provide six degrees of freedom of motion for an instrument supported at one end of the support arm. At each juncture or joint between segments, a positioning encoder provides an electrical signal which indicates the motion of one of the segments relative to the adjacent segment. The combined encoder outputs provides information concerning all six degrees of freedom of motion and thus provides a signal which tracks with the motion of the operating instrument. A slave probe coupled to the operating end of the instrument provides a technique of either commanding the positioning of the instrument or, alternatively, tracking with the position of the instrument. The slave probe thus executes a three dimensional contour that is the same as the three dimensional surface traced by the instrument.

10 Claims, 3 Drawing Sheets

MECHANICAL SUPPORT FOR HAND-HELD DENTAL/MEDICAL INSTRUMENT

BACKGROUND OF THE INVENTION

The present invention relates to a mechanical support for hand-held dental/medical instruments and, more specifically, to such a mechanical support which provides six degrees of freedom of motion while permitting the use of position transducers to indicate the position of the instrument.

A variety of different mechanical supports for dental implements are known in the art. Mechanical supports for dental instruments are designed to hold a variety of different, interchangeable instruments. These supports are also designed to permit the operator to have some degree of freedom of movement and further to help minimize the fatigue associated with operating the instruments. This is of particular importance since dentists spend long periods of time working with these dental instruments.

The use of position transducers with dental implements is known in the art. These position transducers produce signals which indicate the position of an associated dental instrument. An example of the use of a position transducer with a dental implement is set forth in my issued U.S. Pat. No. 4,182,312, which discloses a dental probe, capable of providing the user with three dimensional positional information.

The prior art dental probe with its associated positional encoders requires that the dental implement be attached mechanically to a patient's jaw. Although this allows obtaining positional information, it is uncomfortable for the patient and makes it impossible for the dentist to lay down the probe and to easily operate the same.

Although the use of positional encoders to indicate position is desirable, it must be borne in mind that since the dentist uses the instrument for long periods of time the positional encoders must be arranged in a manner that does not unduly increase the weight and stress borne by the dentist's arm and hands.

Accordingly, it is an object of the present invention to provide a mechanical support for supporting hand-held dental and medical instruments which is usable with positional encoders.

It is another object of the present invention to provide such a mechanical support which allows the use of positional encoders without the need of mechanically connecting the dental instrument to the patient's jaw.

Still a further object to the present invention is to provide such a mechanical support which is relatively light and which does not unduly stress the operator's hand and arm.

Still a further object of the present invention is to provide such a mechanical support which gives the dentist freedom of motion in all three translational and all three rotary directions.

A further objective is to provide an apparatus and technique which permits the dentist to operate to obtain results independent of the movement of the patient's head so that the patient's head can move at any time in the procedure.

A related objective is to provide such an apparatus and technique as will permit the dentist to be able to put down the probe during the course of the procedure for any purpose. For example changing the operating point, and return to the patient and continue with the procedure even though the patient's head has moved and the probe has been put down and worked on.

A further related purpose of this invention is to simultaneously provide information concerning the motion of the patient's jaw.

BRIEF DESCRIPTION

In one embodiment of the present invention a mechanical support is provided which is capable of holding various dental/medical instruments. The mechanical support includes an adjustable fixed platform and further includes first, second, third, fourth, fifth and sixth movable segments. Each of the six movable segments has a longitudinal axis and the longitudinal axis of each segment is approximately a extension of the longitudinal axis of adjacent segments.

The first segment of the mechanical support is coupled to the fixed platform while the sixth segment of the mechanical support is adapted to be connected to an operating instrument. The operating instrument is connected to the sixth segment and a follower is also connected to the sixth segment and positioned such that a distal point on the follower will track with the active point of the operating instrument.

The mechanical support includes first, second, third, fourth, fifth and sixth joints. The first joint connects the first segment of the platform and successive joints connect successive segments to each other. Each of the joints provides rotation about a predetermined axis. The second joint provides rotation along a longitudinal axis shared by the two segments (second and third segments) connected by that joint. The third joint provides rotation about an axis perpendicular to a first longitudinal axes of the two segments (third and fourth segments) connected by the third joint. The fifth joint provides rotation about an axis perpendicular to a second plane. The second plane is defined by all positions of the longitudinal axes of the two segments connected by the (fourth and fifth segments) fifth joint. The second plane is perpendicular to the first plane.

Connected to each segment is one of six positional encoders. Each encoder is associated with one of the rotatable joints to provide data on the motion of the segment involved relative to that joint.

BRIEF DESCRIPTION OF THE DRAWINGS

FIG. 1 illustrates the six segments 14-24 of this embodiment in an extended position.

DESCRIPTION OF THE PREFERRED EMBODIMENT

As shown in the figures, all of which relate to the same embodiment, a multiple segment support arm 10 extends from a fixed platform 12. The support arm 10 includes six segments 14–24 which includes a first segment 14 that is connected to the fixed platform 12. The six segments are interconnected to the platform and to one another with six joints 26–36. These joints 26–36 are each capable of rotational movement and permit each of the six segments to rotate relative to adjacent segments. By providing six separate points for rotational movement, an operating instrument 38 can move with the full six degrees of freedom of movement; specifically along the three translational axes along the three rotational axes.

Figure 1:
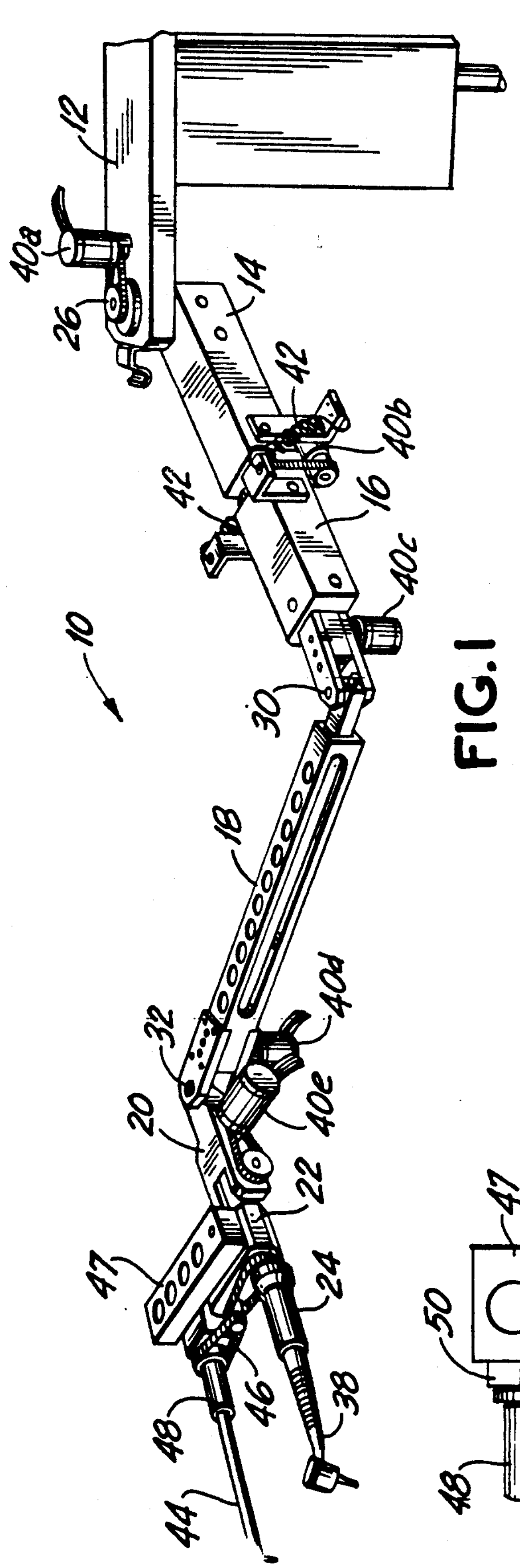
FIG. 1 is a perspective view of an embodiment of this invention in which the various arms are pulled out into the most extended position.
Figure 2:
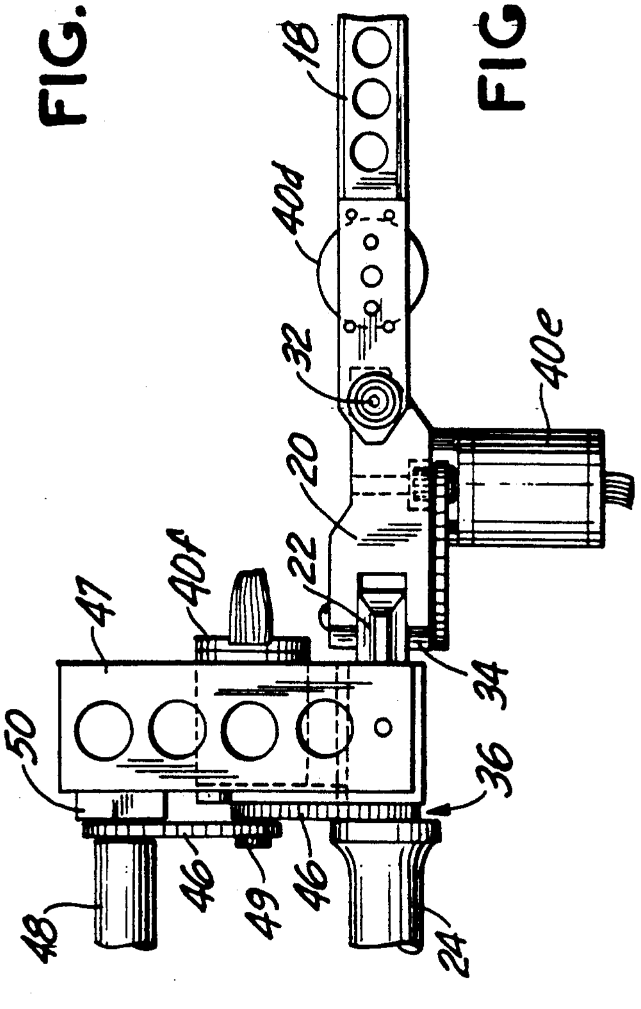
FIG. 2 is a top plan view showing the coupling and relationship between the instrument end of the FIG. 1 arm and in particular showing the segments 18, 20, 22 and 24.
Figure 3:
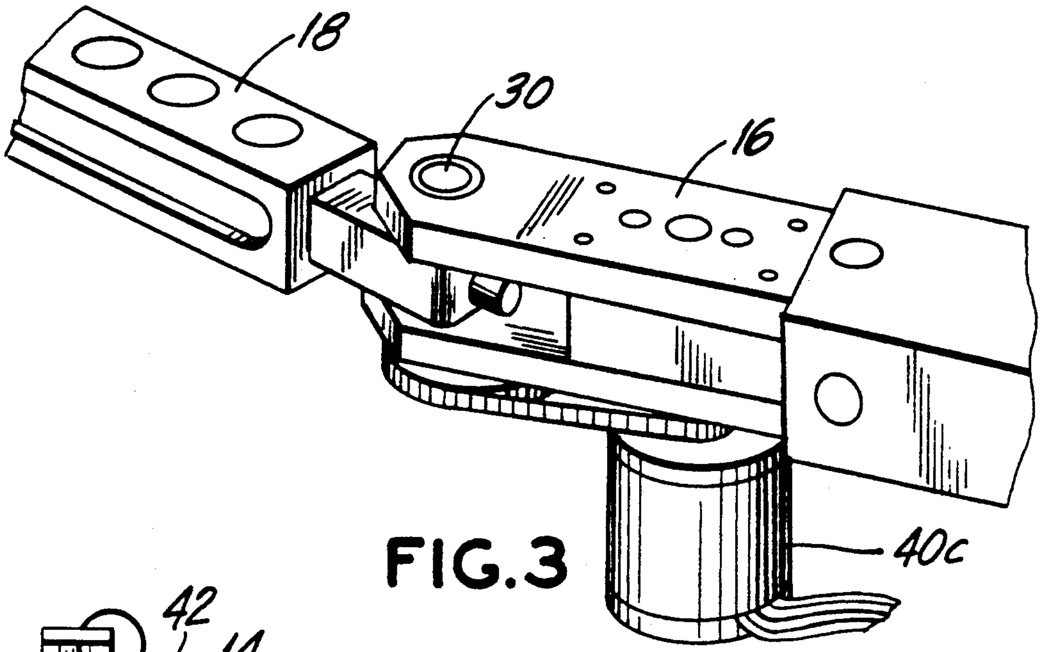
FIG. 3 is a perspective view showing the relationship between the segments 16 and 18 of the FIG. 1 arm.
Figure 4:
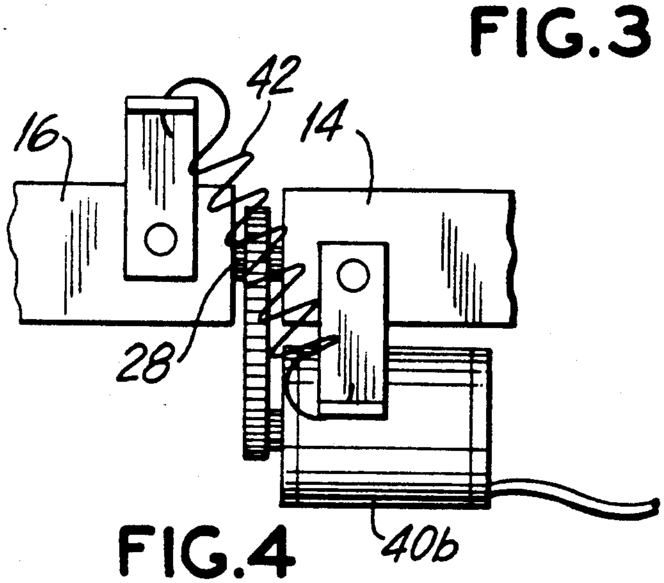
FIG. 4 is a side view showing the relationship between the segments 14 and 16 of the FIG. 1 arm.
Figure 5:
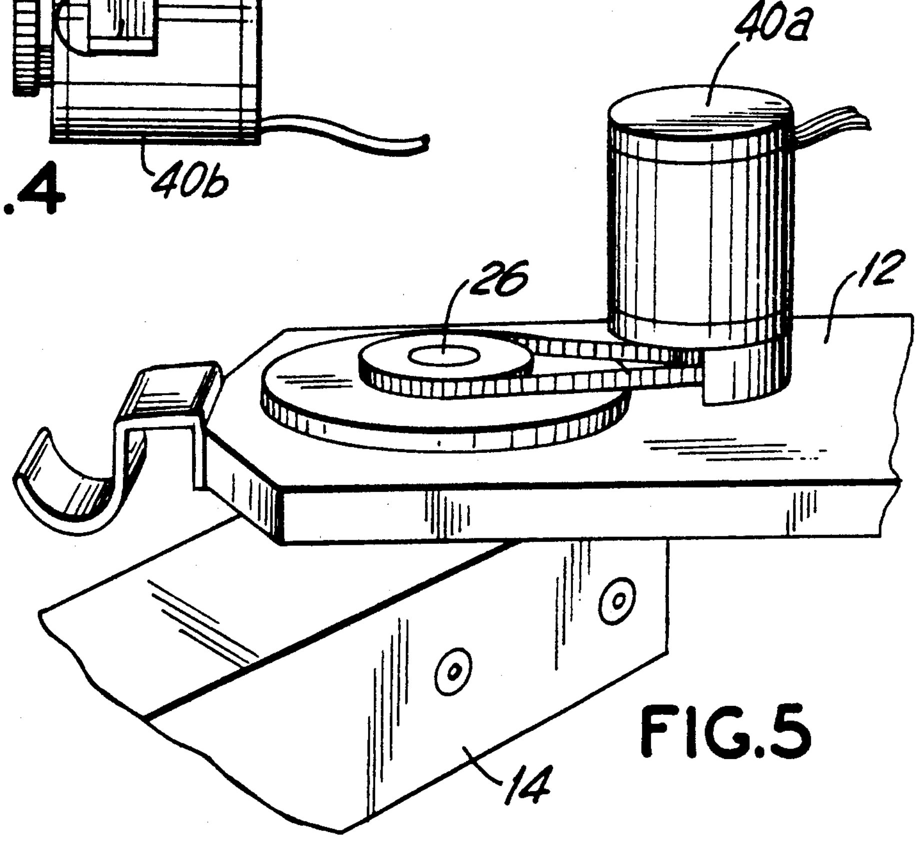
FIG. 5 is a perspective view showing the relationship between the stationary platform 12 and the segment 14 of the FIG. 1 arm.
Figure 6:
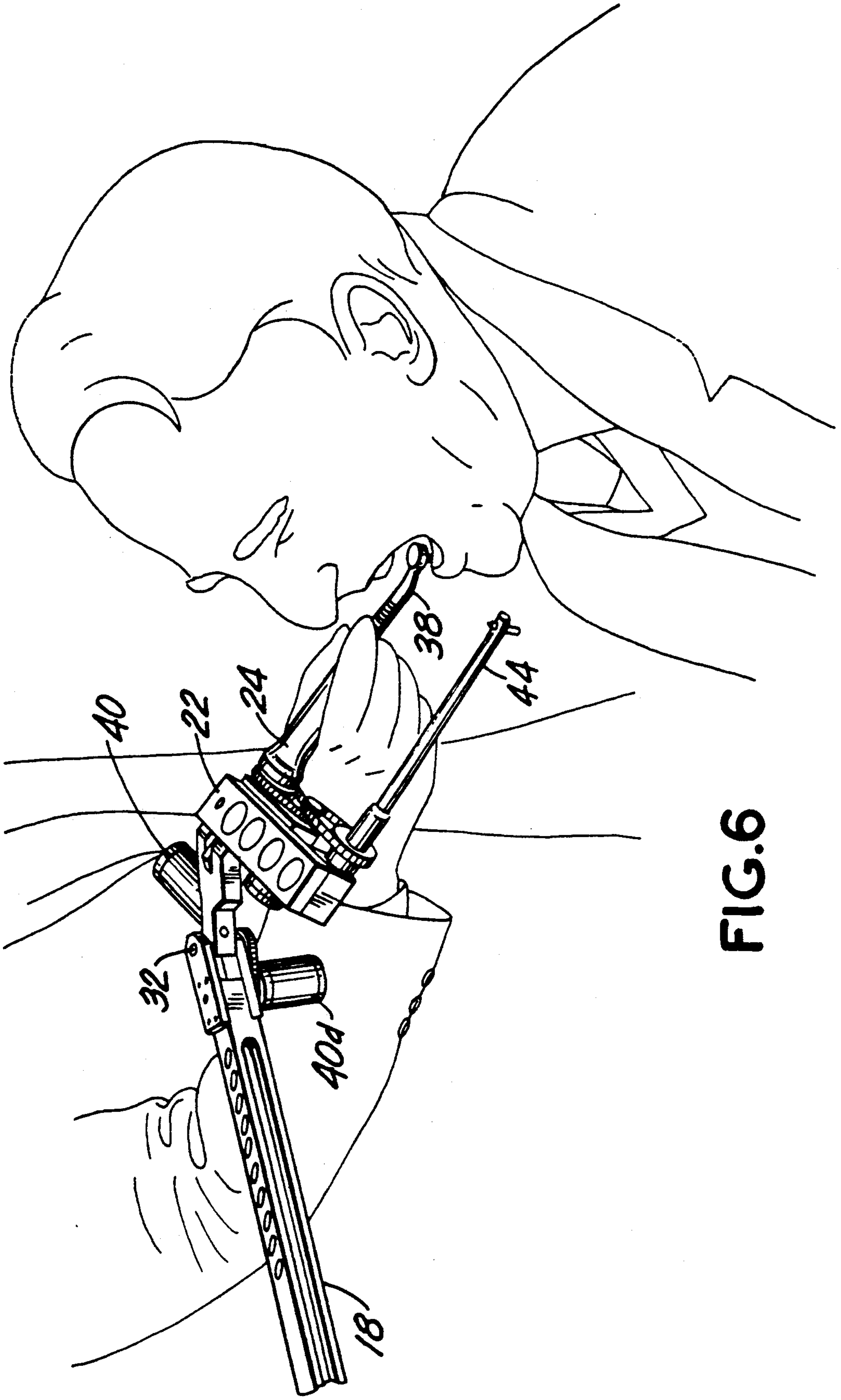
FIG. 6 is a perspective view showing the instrument of the FIG. 1 arm in use with an instrument 38 to the segment 24 of the FIG. arm and with the slave probe 44 connected.

More particularly, the stationary platform 12 and first segment 14 are connected at joint 26 to provide rotation relative to one another about a substantially vertical axis. The first segment 14 and the second segment 16 are connected to one another for rotation about an axis which is essentially a horizontal axis and which axis is co-extensive with the axes of the two segments 14 and 16. Joint 28 (see FIG. 4) provides this rotational movement. The springs 42 serve to turn these two arm segments 14 and 16 to the normal position shown in FIG. I. The second arm segment 16 and third arm segment 18 are connected together at a joint 30 to provide relative rotation between these two segments position as shown in FIG. 1, is a substantially vertical axis. It has to be kept in mind, however, that the axis at the joint 30 does not remain vertical during use of the support arm 10.

A probe 44 is mounted to the sixth segment 24 and, through belts 46, rotates in synchronism with the operating instrument 38. In this fashion, the probe 44 is slaved to the operating instrument 38. Accordingly, a three dimensional configuration traced by the tip of the operating instrument 38 will be replicated by the tip of the slave probe 44. This replicated motion can be used to, for example, trace out the three dimensional configuration on a compliant material or, alternatively, by coupling the tip of the slave probe 44 to a sensor generate a signal which defines the three dimensional configuration traced by the tip of the operating instrument 38.

The probe 44 can also be used as a master of the slave probe in that it can be traced over a three dimensional configuration and thereby determine the positioning of the instrument 38.

Each of the joints 26–36 is formed to have sufficient friction to allows the joint to hold a position once placed therein. However, the friction of each joint is low enough so that movement of the joint can be commenced fairly easily. To further aid in allowing each joint to be both easily moved but able to maintain a position, the joint 28 is provided with springs 42 to provide a counter-balance to the weight of the operating end portions of the support arm 10.

Four of the joints between adjacent segments are arranged so that the adjacent segments rotate relative to one another around an axis which is perpendicular to the plane defined by the longitudinal axes of the two segments involved. However, there are two cases where the adjacent segments rotate relative to one another about an axis with a somewhat different relationship. The segments 14 and 16 rotate about one another along a joint 28 whose axis is parallel to if not identical to the longitudinal axes of the two segments 14 and 16. The same relationship holds true for the rotational motion between the segments 22 and 24 in that the segment 24 rotates about an axes which is the same as the axes of the two segments 22 and 24.

In the preferred embodiment, wherein the slave probe 44 is employed, a bridging segment 47 is rigidly connected between the segment 22 and a base 50. The holder 48 is mounted to the base 50 for rotational movement about the axis of the holder 48 and is rotationally slaved to the segment 24 by virtue of the two belts 46. The two belts 46 are coupled to one another by being mounted on a common wheel 49.

One each of six positional encoders 40 (designated 40*a* through 40*f*) are associated with each joint 26–36. The positional encoders 40 provide output signals which, using known technology, provide an encoding of the position of the instrument 38 connected at the operating end of the support arm 10. Each encoder 40 is coupled to the rotating member of the associated joint 26–36 by a belt, some of which are omitted from the FIGs to clarify illustration.

In this fashion, the six encoders 40 provide information responsive to all six degrees of freedom of motion. This permits maintaining in memory a continuous track of the position of the tip of the instrument 38. This information can be used to provide an image of the surface over which the instrument 38 is passed. Perhaps, more importantly, it can be used as a technique for running a control over the positions of the instrument 38. For example, if the dentist knows that he doesn't wish to go more than two millimeters down from a particular start point, a two millimeter boundary can be preprogrammed and the drilling instrument caused to stop if it is down more than two millimeters. In this fashion, a software boundary can be created relative to a start point which can cause a signal to be generated if the boundary is reached or can cause the instrument to be turned off if the boundary is reached.

The jaw attachment shown in Mushabac U.S. Pat. No., 4,182,312 indicates a technique for providing a device that will track with the motion of the jaw at the same time that the instrument 38 is moving over the surface of the tooth involved. This mechanical tracking with the motion of the jaw can be coupled by any one of a number of known techniques, optical or electromechanical, to provide a signal indicating the real time position in space of the jaw. This position in space of the jaw can be correlated in real time with the position information provided by the device of FIG. 1 so that the encoder information can be corrected for jaw movement thus providing a normalized positioned in the space of the tooth regardless of the actual position of the jaw.

What is claimed is:

1. A device for use with a dental/medical operating instrument to obtain three-dimensional contour information, comprising:

a plurality of arm segments pivotally connected in sequence to one another to form an articulated assembly of said arm segments, said assembly having a first end and a second end, first mounting means for mounting a first end of said articulated assembly to a stationary platform, second mounting means for attaching an operating instrument to the second end of said articulated assembly, a plurality of encoders, each of said encoders being associated with one of said segments to provide an electrical signal indication of the position of each of said segments, wherein the position of the operating instrument can be tracked on a continuous basis.

2. The device of claim 1 further comprising:

a slave probe coupled to said second end of said articulated assembly, said slave probe having a tip which tracks with movement of the tip of said operating instrument.

3. A mechanical support for a hand held dental/medical operating instrument to provide three-dimensional contour information comprising:

a plurality of movable segments, each of said segments having a longitudinal axis, said longitudinal axes of said segments being arranged along a single line to provide an articulated assembly having a first end and a second end, said first end adapted to be coupled to a fixed platform, said second end adapted to be connected to an operating instrument, a plurality of joints, a first one of said joints adapted to connect said first end to a platform and each of the rest of said joints connecting successive ones of said segments to each other, each of said joints providing rotation about a predetermined axis, at least two of said joints providing rotation around a longitudinal axis shared by the two of said segments connected by said joint, the rest of said joints providing for rotation about an axis perpendicular to a plane defined by all positions of the longitudinal axes of the two segments connected by said joints, and a plurality of encoders, each of said encoders being associated with one of said segments to provide an electrical signal indication of the position of each of said segments, whereby the position of the operating instrument can be tracked on a continuous basis.

4. The device of claim 3 further comprising:

a slave probe coupled to said second end of said articulated assembly, said slave probe having a tip which tracks with movement of the tip of the operating instrument connected to said second end.

5. A mechanical support for hand held dental/medical operating instruments to provide three-dimensional contour information comprising:

a fixed platform, first, second, third, fourth, fifth and sixth movable segments, each of said six segments having a longitudinal axis, said longitudinal axes of said segments being arranged along a single line, said first segment being coupled to said platform, said sixth segment adapted to be connected to an operating instrument, first, second, third, fourth, fifth and sixth joints, a first one of said joints connecting said first segment to said platform and each of the rest of said joints connecting successive ones of said segments to each other, each of said joints providing rotation about a predetermined axis, at least two of said joints providing rotation around a longitudinal axis shared by the two of said segments connected by said joint, the rest of said joints providing rotation about an axis perpendicular to a plane defined by all positions of the longitudinal axes of the two segments connected by said joint, whereby the tip of an operating instrument connected to said sixth segment is enabled to move with six degrees of freedom of motion, a plurality of encoders associated with each of said movable segments to provide an electrical signal indication of the position of each of said movable segments, whereby the position of the operating instrument can be tracked on a continuous basis.

6. The support of claim 5 further comprising:

a slave probe mounted on said fifth segment and coupled to said sixth segment, said slave probe having a tip which tracks with movement of the tip of any operating instrument connected to said sixth segment.

7. The support of claim 5 wherein:

at least said second sixth joints are ones providing rotation about a longitudinal axis shared by the two of said segments connected by the joint involved.

8. The support of claim 6 wherein:

at least said second sixth joints are ones providing rotation about a longitudinal axis shared by the two of said segments connected by the joint involved.

9. A mechanical support for hand held dental/medical operating instruments to provide three-dimensional contour information comprising:

first, second, third, fourth, fifth and sixth movable segments, each of said six segments having a longitudinal axis, said longitudinal axes of said segments being arranged along a single line, said first segment adapted to be coupled to a platform, said sixth segment adapted to be connected to an operating instrument, first, second, third, fourth, fifth and sixth joints, a first one of said joints connecting said first segment to said platform and each of the rest of said joints connecting successive ones of said segments to each other, each of said joints providing rotation about a predetermined axis, at least two of said joints providing rotation around a longitudinal axis shared by the two of said segments connected by said joint, the rest of said joints providing rotation about an axis perpendicular to a plane defined by all positions of the longitudinal axes of the two segments connected by said joint, whereby the tip of an operating instrument is connected to said sixth segment is enabled to move with six degrees of freedom of motion, and a slave probe mounted on said fifth segment and coupled to said sixth segment, said slave probe having a tip which tracks with movement of the tip of any operating instrument connected to said sixth segment.

10. The support of claim 9 wherein:

at least said second and sixth joints are ones providing rotation about a longitudinal axis shared by the two of said segments connected by the joint involved.

* * * * *